June 7, 1949.　　　　B. E. LUBOSHEZ　　　　2,472,599
DENTAL X-RAY FILM PACKAGE
Filed Sept. 21, 1945

BENJAMIN E. LUBOSHEZ
INVENTOR
BY
ATTORNEYS

Patented June 7, 1949

2,472,599

UNITED STATES PATENT OFFICE 2,472,599

DENTAL X-RAY FILM PACKAGE

Benjamin E. Luboshez, Rochester, N. Y., assignor to Eastman Kodak Company, Rochester, N. Y., a corporation of New Jersey Application September 21, 1945, Serial No. 617,758

12 Claims. (Cl. 250—69)

The present invention relates to photographic film, particularly to dental X-ray film, and more specifically to a fusible or low melting point alloy coating or enclosure for such films.

In order to provide for the automatic processing of dental X-ray film without a darkroom, it is necessary that some form of stripping device or mechanism be provided for removing the outer packaging, or that a means of processing through the packaging be devised.

According to the present invention, the light-tight film packaging is removed in the first stage of the processing without the necessity of complicated mechanical devices, or in fact, any mechanical devices at all. The film wrapper of the present invention consists of one or more layers of thin metal foil composed of a low melting point alloy which may be used in much the same manner as the present paper wrapping. This thin foil covering in front of the film would not increase the exposure time to any appreciable extent. It would, by removal of some of the secondary and scattered radiation, improve the quality of the resulting radiograph. The film may be wrapped either by the present mechanical method or by coating, dipping, or other means.

The object of using a low melting point alloy for the covering or wrapping lies in the ease with which it can be completely removed by passing the package through warm water or processing solution. The package can be dropped into a slot in a simple light-tight processing unit containing a hot water or processing bath which serves to melt the protective low melting point wrapper or covering to expose the film to the processing liquid. The film is then processed and dried and delivered in a few minutes to the other end of the unit. The cost for such a new package need be no greater than that of present-day packages; but, in any case, since the entire amount of metal used in the coating or wrapper can be recovered by simply collecting from the bottom of the hot water tank, the cost of the package presents no problem.

By using dental films with hardened emulsions, such as are in any case necessary for rapid processing, there is no danger of injuring the film by the warm solution or water. However, low melting point alloys can be obtained which melt at almost any desired temperature, and since the hardened emulsions can stand temperatures approaching the boiling point of water, there is no difficulty in choosing a suitable alloy to use as a wrapper or enclosure. Convenient temperatures in practice might be between 110° F. and 170° F. Most of the suitable alloys contain bismuth, lead, tin, and indium in various proportions.

The present invention has, therefore, as its principal object a light-tight low melting point alloy wrapping or enclosure for dental X-ray film.

Another object of the invention is the provision of a wrapper of this class which may be applied by the present mechanical means used with paper wrappers.

Still another object of the invention is the provision of such a wrapper or covering which may be easily, quickly, inexpensively and automatically removed after the exposure of the film.

Yet another object of the invention is the provision of a wrapper or enclosure of the type described which is relatively inexpensive, easy to handle, and highly effective in use.

To these and other ends, the invention resides in certain improvements and combinations of parts, all as will be hereinafter more fully described, the novel features being pointed out in the claims at the end of the specification.

In the drawings.

Similar reference numerals throughout the various views indicate the same parts.

Figure 1:
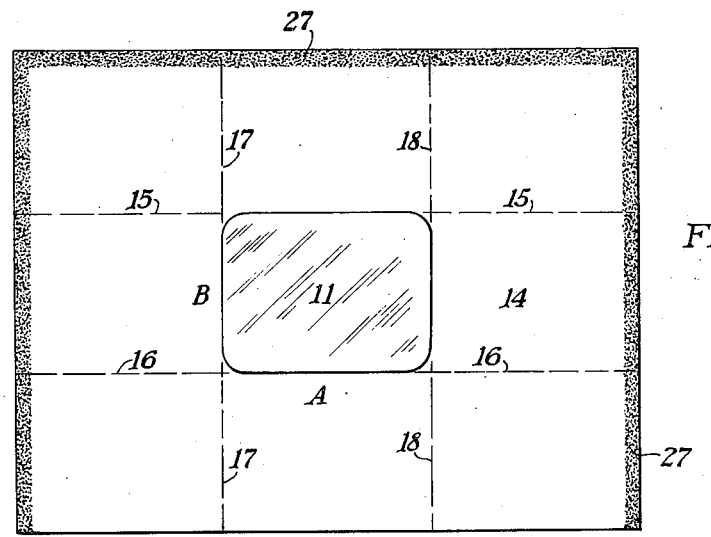
Fig. 1 is a view of the dental X-ray film showing the relation thereto of the low melting point wrapper used to encase the film in a light and water-tight enclosure.
Figure 2:
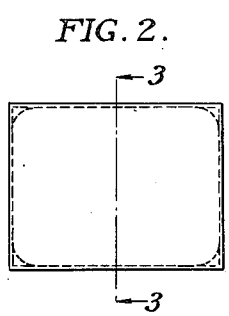
Fig. 2 is a front view of the completely wrapped film.
Figure 4:
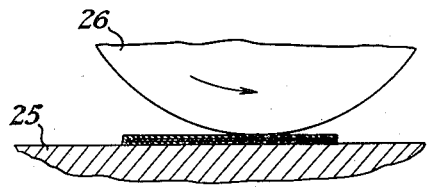
Fig. 4 shows one method of sealing the wrapped film package.
Figure 3:
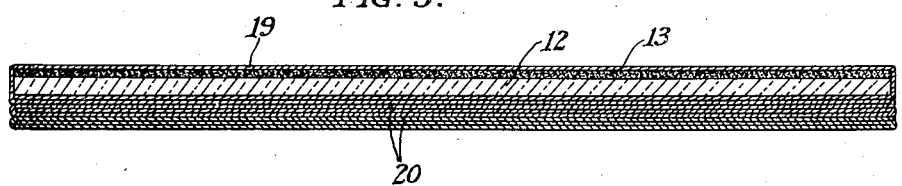
Fig. 3 is an enlarged sectional view taken through the wrapped film showing the relation of the film and the various portions of the wrapper.

Figs. 1 and 3 show a dental X-ray film 11 of well known construction having a base or support 12 on one face of which is coated a light sensitive emulsion 13. The film has a length A and a width B. The film 11 is positioned, emulsion side down, at the center of the wrapper 14 comprising a thin sheet or foil of a low melting point alloy having a length equal to three A and a width equal to three B, as is apparent from an inspection of Fig. 1. With the parts arranged as shown in Fig. 1, one side, say the upper side of the wrapper, is folded lengthwise along the line 15 to overlie the back of the film. The opposite side, the lower side, is then folded along line 16 to overlie the previously folded part. The wrapper is now folded to provide a single layer on the emulsion side of the film and a double layer on the back of the support. The left and right hand portions of the wrapper project laterally from the opposite side edges of the film and have three superimposed layers of width B. These three-layer portions are then folded along lines 17 and 18 to overlie the double layer to thus provide an eight-layer section or coating on the back of the film, as shown in Fig. 3.

The completely wrapped film then appears as shown in Fig. 3 with a single layer 19 of wrapping on the emulsion side of the film and a multiple layer arrangement 20 on the back of the film. As the light rays for exposure are directed from the emulsion side, or the top as illustrated in Fig. 3, the single layer 19 of the low melting point alloy wrapper does not increase the exposure time to any appreciable extent. The multi-layer arrangement 20 on the back of the film does, however, provide an effective means for removing secondary radiation which might affect the image on the emulsion 13. This multi-layer arrangement eliminates the use of the usual lead sheet backing normally employed with X-ray film to eliminate such secondary radiation, the advantages of which are apparent to those in the art. Thus this simple wrapper not only encases the film in a light-tight and moisture-proof enclosure, but also effectively protects the sensitive film against secondary radiation during exposure. Also, the wrapper can be readily and easily removed by merely passing the entire package into a bath of hot water or a processing solution which melts the wrapper and causes the latter to drop off the film to expose the latter to the processing solution.

After the film 11 is wrapped, it is preferably passed between a pair of pressure members such, for example, as a plate 25 and a roller 26 which serves to press the wrapper into a compact and flat unit. With certain types of alloys, sealing of the package may be secured by suitably heating the wrapper to cause the latter to slightly melt to fuse the various layers 20. This can be secured during the pressure operation by heating one of the pressure members 25 or 26. Of course, the heated member is to be applied to the back of the package to seal the multi-layer of folds 20. Preferably, however, the water soluble cement 27 is applied to the wrapper in the position shown in Fig. 1 and to the upper surfaces of the three-layer side portions, so that when the wrapped film passes between the pressure members 25 and 26, the latter serves to press the layers together to cause the cement to adhere to the layers to form a light and moistureproof enclosure. When the package is then placed in the hot water to remove the wrapping, the water will dissolve the cement as well as the foil wrapper.

Figure 5:
Fig. 5 is a sectional view through another film package, showing a different type of low melting-point alloy coating or encasing for the film.

While in the preferred construction, the film is enclosed in the wrapper 14, which provides a single protecting layer 19 on the emulsion side of the film and a multi-layer arrangement 20 on the back of the film, it may be sometimes desirable or advantageous to eliminate the multi-layer protection on the back of the film to provide a more compact package. To secure this result, the film 11 may be dipped or passed through a bath of a suitable low metal point alloy to encase the film in a single layer coating 30 shown in Fig. 5. This single coating will effectively protect the film prior to exposure, yet may be easily removed, as cited above, prior to the processing operation. Obviously, this single layer arrangement will not protect the film against secondary radiation in the same manner as the type disclosed in Figs. 1 and 3. However, if desired, a separate piece of low melting alloy may be applied to the back of the film prior to coating to provide a multi-layer portion on the back of the film.

The above described embodiments show dental X-ray film 11 encased or wrapped in a light-tight moistureproof layer of a low melting point alloy. In some cases, the use of exposed metal covering may be objectionable when placed in the mouth of a patient. In such instances, the metal coated or enclosed film may be wrapped in an outer or auxiliary wrapping of paper or similar material which may remain in place until after exposure when it may then be removed in daylight. The protective metal coating or covered film may then be placed in a light-tight container containing the hot water or processing bath which effectively and readily removes the low melting point wrapping or covering to uncover the exposed film to permit the processing of the latter.

The present invention thus provides an effective protective coating of a low melting point alloy for the film. The coating may be applied as a single layer by dipping, or may be in the form of a wrapper which lends itself to automatic wrapping means. In either case, the light and moistureproof package covering or enclosure is provided which can be readily removed by merely placing the package in a light-tight bath of hot water or processing solution. The removed coating then falls to the bottom of the bath and may be recovered. The uncoated exposed film may then be processed.

While various low melting point alloys may be used, the examples listed below give alloys which may be used with X-ray films having hardened emulsions.

*Example 1*

Lipowitz metal, which has a melting point of 160° F. and the following composition: 50 per cent Bi, 26⅔ per cent Pb, 13⅓ per cent Sn, and 10 per cent Cd.

*Example 2*

Woods metal, also having a melting point of 160° F. and the following composition: 50 per cent Bi, 26.7 per cent of Pb, 10 per cent Cd, and 13.3 per cent of Zn.

The above examples are merely illustrative and not inclusive, as various other alloys or compositions of low melting point materials may be used to provide the necessary protective coating or wrapper.

While certain embodiments of the invention have been disclosed, it is to be understood that the inventive idea may be carried out in a number of ways. This application is, therefore, not to be limited to the precise details described but is intended to cover all variations and modifications thereof falling within the scope of the appended claims.

I claim:

1. In a film package, the combination with a sheet of photographic film, of a metallic enclosure for said film juxtaposed thereon and having a melting point substantially below that of the film emulsion.

2. In a film package, the combination with a sheet of photographic film, of a fusible protective coating for said film juxtaposed thereon and having a fusing point substantially below that of the film emulsion.

3. In a film package, the combination with a sheet of photographic film, of a light-tight enclosure for said film juxtaposed thereon and formed of an alloy having a melting point substantially below that of the film emulsion.

4. In a film package, the combination with a sheet of photographic film having a hardened emulsion coating formed thereon, of an enclosure for said film juxtaposed thereon and formed from an alloy having a melting point substantially below the melting point of said emulsion.

5. In a film package, the combination with a sheet of photographic film, of a wrapper for said film juxtaposed thereon and formed from a sheet of a low melting point alloy having a melting point substantially below that of the film emulsion.

6. In a film package, the combination with a sheet of film, having an emulsion coating on one side thereof, of a low melting point metallic wrapper for enclosing said film and juxtaposed thereon and with a single layer on said one side and a multiple layer on said other side said wrapping having a melting point substantially below that of said emulsion.

7. In a film package, the combination with a sheet of photographic film, of a sheet of low melting point alloy for enclosing said film and juxtaposed thereon and with a single layer on one side and a plurality of layers on the other side said sheet having a melting point substantially below that of the film emulsion.

8. In a film package, the combination with a sheet of photographic film having a hardened sensitized emulsion on one side thereof, of a thin sheet of a fusible metallic material for wrapping said film to provide a light-tight enclosure therefor, said sheet having a fusing temperature below that of said emulsion.

9. In a film package, the combination with a sheet of dental X-ray film having a hardened sensitized emulsion on one side thereof, of a wrapper for said film comprising a sheet of a low melting point alloy juxtaposed on and adapted to enclose said film in a light-tight relation with a single layer of said wrapper over said one side and multiple layers of said wrapper over said other side said wrapping having a melting point substantially below that of said emulsion.

10. In a film package, the combination with a sheet of photographic film, of a seamless container juxtaposed on said film and formed from a metal having a melting point substantially below that of the film emulsion.

11. In a film package, the combination with a sheet of photographic film, of a seamless one-piece enclosure for and juxtaposed on said film formed from a fusible alloy having a melting point substantially below that of the film emulsion.

12. In a film package, the combination with a sheet of photographic film having a hardened emulsion on one side thereof, of a seamless enclosure for said film formed from a low melting point alloy having a fusing temperature below the melting point of said emulsion.

BENJAMIN E. LUBOSHEZ.

REFERENCES CITED

The following references are of record in the file of this patent:

UNITED STATES PATENTS

| Number | Name | Date |
|---|---|---|
| 1,536,345 | Jones et al. | May 5, 1925 |
| 2,071,110 | Burke | Feb. 16, 1937 |

FOREIGN PATENTS

| Number | Country | Date |
|---|---|---|
| 114,933 | Great Britain | Apr. 25, 1918 |

OTHER REFERENCES

"Cerrobend," bearing date May 2, 1944 (a pamphlet published by Cerro de Pasco Copper corporation, 40 Wall St., N. Y. C. and available for inspection in Div. 14).